United States Patent
Casey et al.

(10) Patent No.: US 12,242,775 B2
(45) Date of Patent: Mar. 4, 2025

(54) ELECTRICAL POWER GRID INTERCONNECTIONS

(71) Applicant: X Development LLC, Mountain View, CA (US)

(72) Inventors: Leo Francis Casey, San Francisco, CA (US); Xinyue Li, San Mateo, CA (US); Page Furey Crahan, San Francisco, CA (US); Raymond Daly, Palo Alto, CA (US); Peter Evans, Los Altos Hills, CA (US); Xing Chen, Sunnyvale, CA (US); Amanda McNary, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 840 days.

(21) Appl. No.: 17/354,012

(22) Filed: Jun. 22, 2021

(65) Prior Publication Data
US 2021/0406425 A1    Dec. 30, 2021

Related U.S. Application Data

(60) Provisional application No. 63/045,360, filed on Jun. 29, 2020.

(51) Int. Cl.
*G06F 30/20* (2020.01)
*G06T 11/00* (2006.01)
(Continued)

(52) U.S. Cl.
CPC ............ *G06F 30/20* (2020.01); *G06T 11/001* (2013.01); *G06T 11/206* (2013.01); *H02J 3/00* (2013.01);
(Continued)

(58) Field of Classification Search
CPC ...... G06F 30/20; G06F 2113/04; G06F 30/25; G06F 30/27; G06F 30/28; G06F 2111/00;
(Continued)

(56) References Cited

U.S. PATENT DOCUMENTS 7,860,702 B1    12/2010  Evans et al.
10,423,884 B2   9/2019   Hyde et al.
(Continued)

OTHER PUBLICATIONS

International Search Report and Written Opinion in International Appln. No. PCT/US2021/038347, dated Oct. 12, 2021, 14 pages.
International Preliminary Report on Patentability in International Appln. No. PCT/US2021/038347, dated Jan. 12, 2023, 9 pages.

*Primary Examiner* — Kibrom K Gebresilassie
(74) *Attorney, Agent, or Firm* — Fish & Richardson P.C.

(57) ABSTRACT

A computer-implemented method executed by one or more processors includes receiving interconnection data for a proposed interconnection to a power grid; accessing a power grid model including a topological representation of the power grid, electrical specifications of grid components, and empirical operation characteristics; and generating, using the interconnection data for the proposed interconnection to the power grid, and the power grid model, simulated power grid data. The simulated power grid data is based on simulating operation of the power grid with the proposed interconnection coupled to a location of the power grid identified by the interconnection data during a simulated time period. The simulated power grid data includes a plurality of different temporal and spatially dependent characteristics of the power grid. The method includes evaluating, using one or more metrics, the simulated power grid data; and outputting evaluation results of the one or more metrics.

20 Claims, 6 Drawing Sheets

(51) Int. Cl.
*G06T 11/20* (2006.01)
*H02J 3/00* (2006.01)
*H02J 13/00* (2006.01)
*G06F 113/04* (2020.01)

(52) U.S. Cl.
CPC .. *H02J 13/00001* (2020.01); *H02J 13/00006* (2020.01); *G06F 2113/04* (2020.01); *G06T 2200/24* (2013.01); *H02J 2203/20* (2020.01)

(58) Field of Classification Search
CPC ............ G06F 2119/22; H02J 13/00006; H02J 13/00001; H02J 3/00; H02J 2203/20; G06T 11/001; G06T 11/206; G06T 2200/24

See application file for complete search history.

(56) References Cited

U.S. PATENT DOCUMENTS

| | | |
|---|---|---|
| 10,444,806 B2 | 10/2019 | Brockman et al. |
| 2005/0033481 A1* | 2/2005 | Budhraja ................ H02J 3/003 700/286 |
| 2008/0109205 A1* | 5/2008 | Nasle ..................... G06F 30/20 703/18 |
| 2012/0191439 A1 | 7/2012 | Meagher et al. |
| 2015/0006128 A1* | 1/2015 | Enenkel ............ H02J 13/00017 703/2 |
| 2016/0139212 A1 | 5/2016 | Lin et al. |
| 2017/0046458 A1 | 2/2017 | Meagher et al. |

\* cited by examiner

200

INTERCONNECTION APPLICATION

202 → PROJECT LOCATION:
ADDRESS: 100 Main St

204 → PANEL:
RATING (DC WATTS): 1000
AC OUTPUT: 1000

206 → INVERTER:
MODEL: Modelname1
KVA RATING: 400
AC VOLTAGE: 120
POWER SUPPLY PHASE: A

208 → ☑ CERTIFIED

210 → ☑ CO-LOCATED WITH LOAD

SUBMIT   RESET FORM

ELECTRICAL POWER GRID INTERCONNECTIONS

CROSS-REFERENCE TO RELATED APPLICATION

This application claims the benefit of U.S. application Ser. No. 63/045,360, filed Jun. 29, 2020, which is incorporated by reference in its entirety.

TECHNICAL FIELD

The present specification relates to electrical power grids, and specifically to evaluating the technical impact of power grid interconnections on a complete grid system.

BACKGROUND

Electrical power grids transmit electrical power to loads such as residential and commercial buildings. Various electrical power grid conditions can be simulated and visualized. An interconnection to an electrical power grid can be an inverter connected resource, and may be a renewable energy source. Adding interconnections to the electrical power grid can affect conditions of the power grid.

SUMMARY

Techniques are described for simulation of electrical power grid interconnections. An interconnection to an electrical power grid can be an inverter connected resource, also referred to as a distributed energy resource (DER). An inverter connected resource can be, for example, a renewable energy power system such as a solar power system.

An electrical grid interconnection simulation system can be used, for example, by grid operators, e.g., utilities. The simulation system can also be used by project developers, property owners, construction companies, and any other involved parties having interest in making additions and/or changes to an electrical power grid.

Prior to permitting installation of an interconnection, a grid operator can use the simulation system to simulate electrical grid operation with the proposed interconnection. The simulation system can perform interconnection analysis over a range of conditions and output results including providing a pass/fail verdict for multiple metrics. Based on results of the simulation, the grid operator can determine whether to approve, deny, or modify the proposed interconnection.

An electrical grid can undergo additions and changes on a continual basis. New buildings, renewable power plants, stationary storage, mobile storage, and expansions to existing buildings, facilities, and loads are some examples of potential changes that can be proposed and made to existing electrical distribution feeders. Before new devices and systems are connected to the electrical power grid, it is often necessary to receive permission from the grid operator for the proposed changes. The grid operator ensures that the proposed changes are not likely to cause operation of the electrical distribution feeder to violate any limits or metrics that are put in place to ensure safe and reliable operation of the electrical power grid.

As the electrical power grid becomes more complex and operating values approach critical limits, detailed prediction studies become more important and more complex. Detailed interconnection studies can be performed to document the operating characteristics of the existing power system, and also the predicted operation of the modified system. In this way, the impacts of the proposed interconnection can be fully evaluated before installation.

The interconnection simulation system can improve the depth and transparency of interconnection applications and studies. The system provides a simple, automated workflow that makes it practical to simulate the direct grid impacts of any interconnection, obviating screening criteria and rules of thumb.

The simulation system can use a calibrated high resolution power grid model. The power grid model can include a model of the as-built grid, and can also include interconnections that have been approved but not yet built. The simulation system can use the power grid model to compare grid conditions prior to connection of the proposed interconnection to predicted grid conditions after connection of the proposed interconnection, in order to identify incremental effects of the interconnection.

Based on the simulation results, the system can evaluate a number of metrics. Example metrics include voltage constraint violations, voltage variability, voltage transients, thermal limits, backfeed constraints, and overvoltage. In some examples, an evaluation result for each metric may be a "pass" or "fail" result.

When outputting a "pass" result, the system can provide margins to operating limits. When outputting a "fail" result, the system can provide the specific failing factors, the timing, frequency, and duration of the failing conditions, and the locations of the failure or failures. The system can also provide recommended changes to the proposed interconnection and/or to the power grid in order to achieve a "pass" result. The recommendations made by the system can include, for example, curtailment, rebuild of electrical assets, addition of storage, voltage controls, etc.

In addition to outputting pass or fail results for various metrics, the system can display characteristics of simulated power grid operations through user interfaces. Example user interfaces include a two-dimensional results map view and a three-dimensional results visualizer with a time-distance scrubber.

The subject matter described in this specification can be implemented in various embodiments and may result in one or more of the following technical advantages. The interconnection simulation system can conduct comprehensive interconnection evaluations using a reduced set of input data. The interconnection simulation system can perform rapid speed simulation over a variety of dynamic power grid operating conditions over a simulated period of time, e.g., based on historical power grid data. The simulation can include predicted operating conditions over discrete time intervals, e.g., over each hour of a simulated year.

Additional technical advantages of the interconnection simulation system include an ability to simulate interconnection impacts on the electrical grid under various predicted load conditions, including variations due to factors such as seasonal effects, calendar effects, and time of day effects. The interconnection simulation system can simulate interconnection impacts at multiple locations of the electrical grid. The interconnection simulation system can simulate various electrical operating characteristics, e.g., current, voltage, power factor, load, etc. at multiple locations, over prolonged simulated periods of time.

The simulation system can be used to simplify a process for applying to install an interconnection to a power grid. The simulation system can be adapted for various locations and standards. The simulation system can account for detailed, accurate electrical grid parameters in order to reduce reliance on assumptions and "rules of thumb." The simulation system can analyze incremental impacts of interconnections, as well as cumulative impacts of multiple interconnections. The simulation system can improve safety and reliability of the electrical power grid due to reducing unexpected impacts of interconnections on the electrical power grid.

In general, innovative aspects of the subject matter described in this specification can be embodied in a method including actions of receiving interconnection data for a proposed interconnection to a power grid; accessing a power grid model including a topological representation of the power grid, electrical specifications of grid components, and empirical operation characteristics; and generating, using the interconnection data for the proposed interconnection to the power grid, and the power grid model, simulated power grid data. The simulated power grid data can be based on simulating operation of the power grid with the proposed interconnection coupled to a location of the power grid identified by the interconnection data during a simulated time period. The simulated power grid data can include a plurality of different temporal and spatially dependent characteristics of the power grid. The method can include evaluating, using one or more metrics, the simulated power grid data; and outputting evaluation results of the one or more metrics.

In some implementations, the evaluation results include pass or fail results for each of the one or more metrics.

In some implementations, the simulated time period includes a simulated year.

In some implementations, generating simulated power grid data includes generating simulated power grid data for each hour of the simulated year.

In some implementations, the one or more metrics reflect criteria from industry standards.

In some implementations, the power grid model includes a model of real-world power grid assets.

In some implementations, the power grid model includes: a model of real-world power grid assets; and a model of one or more previously proposed interconnections to the power grid.

In some implementations, the interconnection data for the proposed interconnection to the power grid includes one or more of a location, a size, a positioning, a power output, or a connecting phase of the proposed interconnection.

In some implementations, the plurality of different temporal and spatially dependent characteristics includes one or more of voltage, current, power, power factor, utilization, or temperature.

In some implementations, the method further includes: generating, using the power grid model, pre-interconnection simulated power grid data; evaluating, using the one or more metrics, the pre-interconnection simulated power grid data to output pre-interconnection evaluation results; and comparing the evaluation results to the pre-interconnection evaluation results to determine a change in evaluation results.

In some implementations, the method includes: modifying the interconnection data for the proposed interconnection; generating, using the modified interconnection data for the proposed interconnection, modified simulated power grid data; evaluating, using the one or more metrics, the modified simulated power grid data to output modified evaluation results; determining that the modified evaluation results are improved over the evaluation results; and outputting the modified interconnection data for the proposed interconnection.

In some implementations, outputting evaluation results of the one or more metrics includes outputting a margin between each evaluation result and a respective passing metric.

In some implementations, outputting evaluation results of the one or more metrics includes generating a graphical user interface (GUI) including a graph representing the evaluation results. The graph can include: an x-axis representing progression of time measured by a first time increment over a first time period; a y-axis representing progression of time measured by a second time increment over a second time period. The second time period is equal to the first time increment. The graph can include a plurality of points. Each of the plurality of points can correspond to an x-axis coordinate and a y-axis coordinate and represent a time interval occurring during the first time period. A color shading of each of the plurality of points can represent a number of violations of an electrical grid parameter during the time interval.

In some implementations, in response to a user selecting a point of the graph, the GUI displays a corresponding evaluation result.

In some implementations, outputting evaluation results of the one or more metrics includes generating a GUI including a map view of the evaluation results. The map view can include: a line-diagram representation of power lines of the power grid overlaid on a map of a geographic region in which the power grid is located, the line-diagram including a plurality of line segments. A color shading of each line segment can represent the evaluation results at a particular spatial location of the power grid.

In some implementations, in response to a user selecting a line segment in the map view, the GUI displays a corresponding evaluation result.

Other implementations of the above aspects include corresponding systems, apparatus, and computer programs, configured to perform the actions of the methods, encoded on computer storage devices. The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 2 illustrates an example user interface for input of interconnection data.

DETAILED DESCRIPTION

Figure 1:
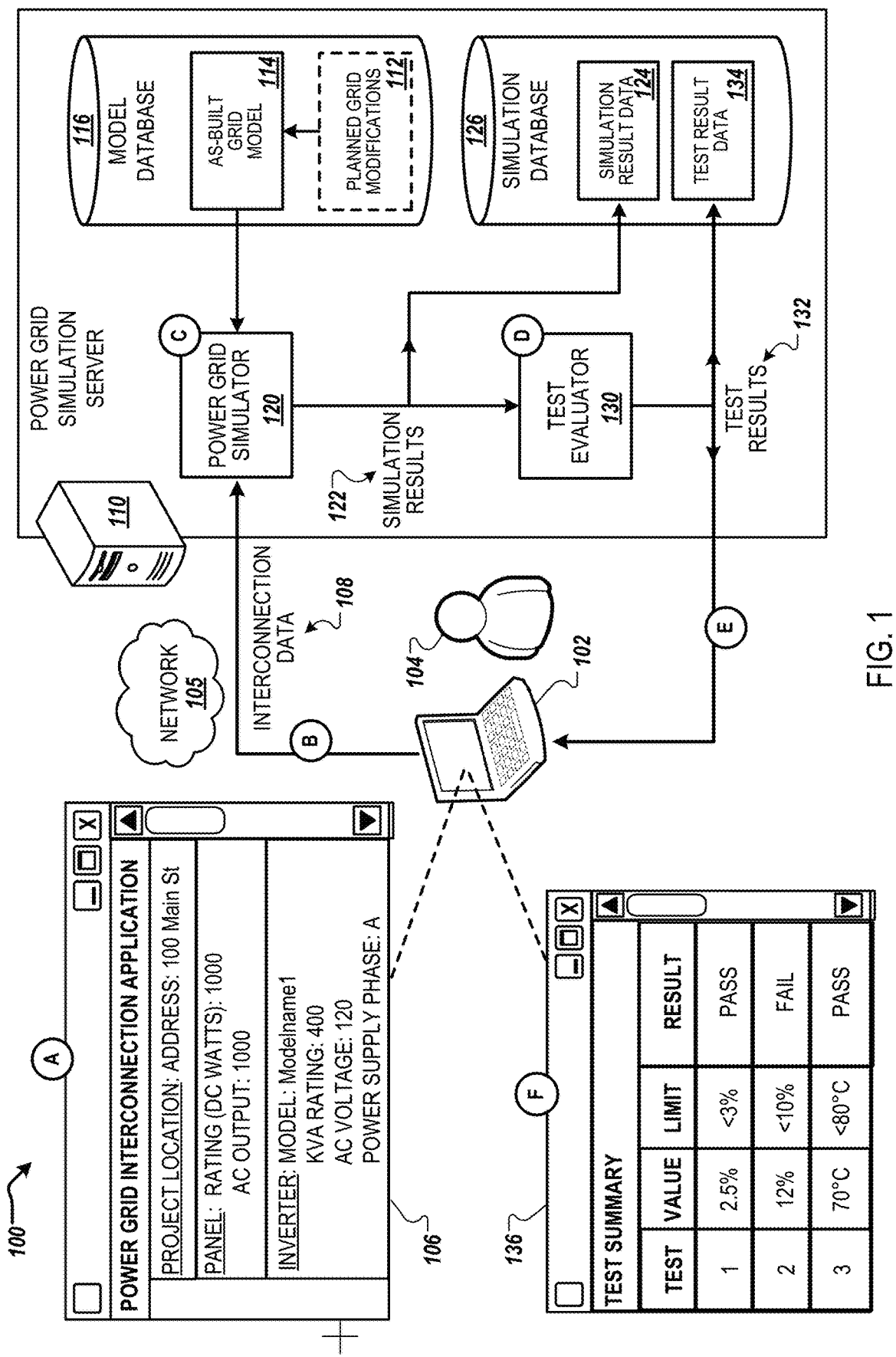
FIG. 1 illustrates an example system for simulation of electrical power grid interconnections.

FIG. 1 is a diagram showing an example system 100 for simulation of electrical power grid interconnections. The system 100 includes a power grid simulation server 110 and a user device 102 accessible by a user 104. The server 110 includes a model database 116 and a simulation database 126. The user device 102 may communicate with the server 110 over, for example, a network 105.

In some examples, the model database 116, the simulation database 126, or both, can be separate from the server 110 and may communicate with the server 110 over the network 105. The network 105 can include public and/or private networks and can include the Internet.

The user device 102 can be an electronic device such as a computing device. The user device 102 can be, for example, a desktop computer, a laptop computer, a smart phone, a cell phone, a tablet, a PDA, etc. The user device 102 is accessible by the user 104.

The server 110 is a server system and can include one or more computing devices. In some implementations, the server 110 may be part of a cloud computing platform. The server 110 may be maintained and operated, for example, by an electrical grid operator such as an electrical power utility.

In general, the user 104 can provide interconnection data 108 to a simulation server 110 through an input user interface 106 provided through a user device 102. The simulation server 110 can conduct simulations to generate simulation results 122. The simulation server 110 can perform tests on the simulation results 122 to generate test results 132. The simulation server 110 can provide the simulation results 122, the test results 132, or both, to the user device 102. The user device 102 can present the simulation results 122, the test results 132, or both, through an output user interface 136.

FIG. 1 illustrates various events, shown as stages (A) to (F), with each representing a step in an example process for simulation of electrical power grid interconnections. Stages (A) to (F) may occur in the illustrated sequence, or in a sequence that is different from the illustrated sequence. For example, some of the stages may occur concurrently.

Figure 6:
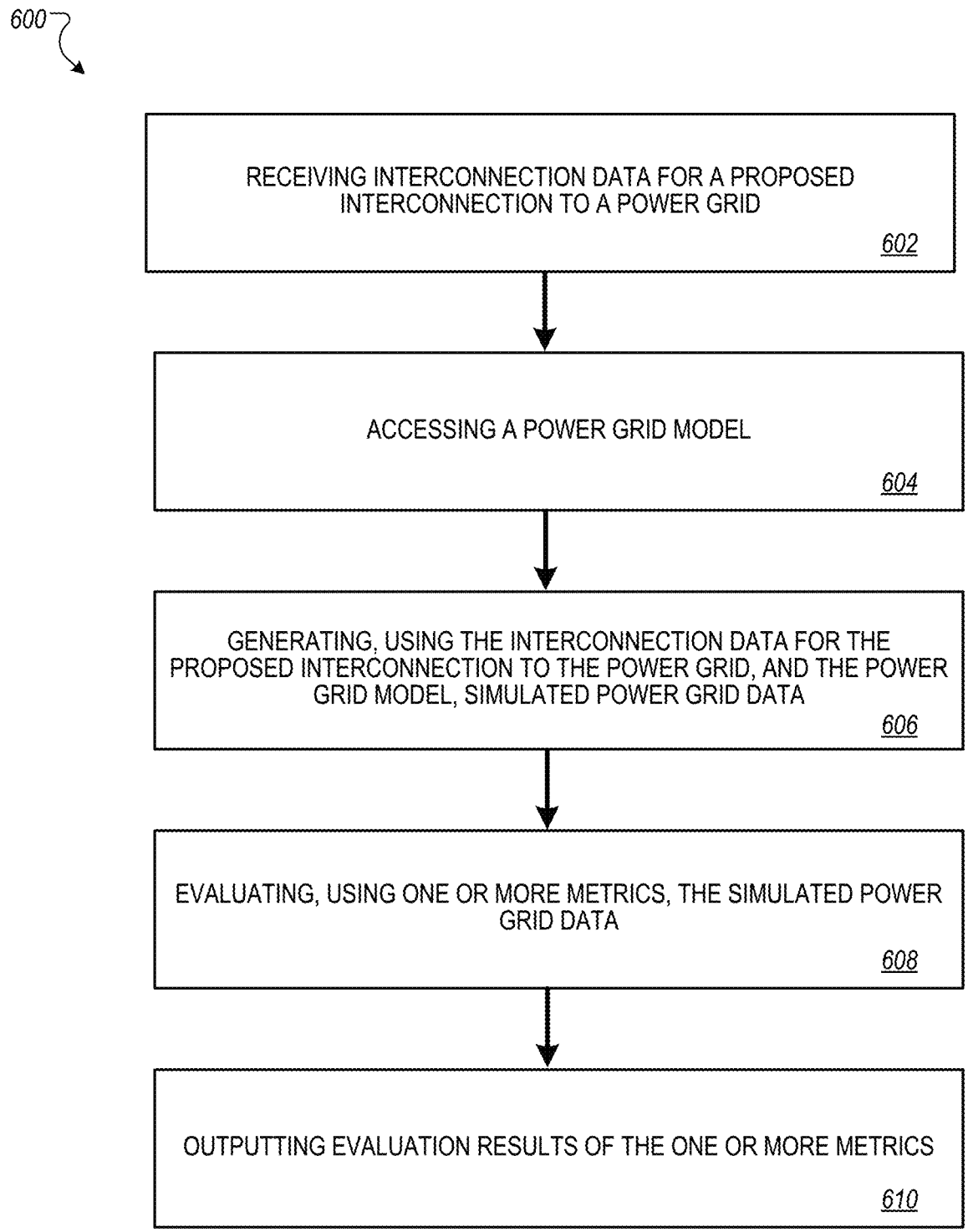
FIG. 6 illustrates an example process for simulation of electrical power grid interconnections.

The system 100 can perform simulations of electrical grid interconnections using a process 600, shown in FIG. 6. The process 600 includes receiving data for a proposed interconnection to a power grid (602). The power grid can be an electrical power grid that transmits electrical power to loads such as residential and commercial buildings. A proposed interconnection can be any change made to existing distribution feeders. A distribution feeder distributes power from a substation of a bulk power system to customer loads. The feeder is supplied from a large substation transformer at the substation, and includes load, or network or service, transformers for the distributed loads. The proposed interconnection can be, for example, a new building, renewable power plant, or stationary or mobile power storage facility. The proposed interconnection can also be, for example, an expansion to an existing building, facility, or electrical load. The interconnection data for the proposed interconnection to the power grid can include, for example, a location, a size, a positioning, a power output, or a connecting phase of the proposed interconnection.

For example, in stage (A) of FIG. 1, the system 100 displays an input user interface 106 to the user 102 via the user device 102. The input user interface 106 can include an input form to enable the user 104 to input interconnection data 108. In some examples, the input form may be a part of a power grid interconnection application that can be used by an electrical grid operator as a basis for approval or denial of the interconnection application.

The input user interface 106 includes input fields for various data. For example, the input user interface 106 includes an input field for project location, panel, and inverter details. The user 104 can input the interconnection data into the input fields. The input user interface 106 is described in greater detail with reference to FIG. 2. In stage (B) of FIG. 1, the user device 102 sends the interconnection data 108 to the power grid simulation server 110, e.g., over the network 105.

The process 600 includes accessing a power grid model (604). The power grid model can include a model of real-world power grid assets, e.g., an as-built grid model 114. The grid model 114 can include a topological representation of the power grid, electrical specifications of grid components, and empirical operation characteristics. The power grid model can also optionally include a model of one or more previously proposed interconnections to the power grid, e.g., planned grid modifications 112 that have not yet been built. The as-built grid model 114 and the planned grid modifications 112 can be stored in a model database 116. The detail of the grid model 114 is sufficient to allow for accurate simulation and representation of steady-state, dynamic and transient operation of the grid.

In some examples, the grid model 114 can include a complete electrical model of a feeder that the proposed interconnection will connect to. For example, the grid model 114 can include a high resolution electrical model of one or more electrical distribution feeders. The grid model 114 can include, for example, data models of substation transformers, distribution switches and reclosers, voltage regulation schemes, e.g., tapped magnetics or switched capacitors, network transformers, load transformers, inverters, generators, and various loads. The grid model model 114 can include line models, e.g., electrical models of medium voltage distribution lines. The grid model 114 can also include electrical models of fixed and switched line capacitors, as well as other grid components and equipment.

The line models can include multiple segments that can represent interconnections between poles. In the case of underground lines, the segments can represent interconnections between risers or between underground connections such as transformers and meters. In some examples, the line models can be represented by equivalent inductors and resistors and capacitors for associated line lengths. In some examples, the line models can include models of mutual inductance between lines, capacitance between lines, and capacitance from the lines to ground. Line model attributes can be based on the line's connection type and on the type of conductors used. Line model attributes can also be based on construction details, e.g., whether the lines are overhead or underground.

The grid model 114 may be calibrated by using measured electrical power grid data. The measured electrical power grid data can include historical grid operating data. The historical grid operating data can be collected during grid operation over a period of time, e.g., a number of weeks, months, or years. In some examples, the historical grid operating data can be average historical operating data. For example, historical grid operating data can include an electrical load on a substation during a particular hour of the year, averaged over multiple years. In another example, historical grid operating data can include a number of voltage violations of the electrical power grid during a particular hour of the year, possibly averaged over multiple years, or otherwise represented statistically.

In some examples, the grid model 114 can include assumptions. For example, the grid model 114 can include measured data for certain locations of the power grid, and might not include measured data for other locations. The grid model 114 can use assumptions to interpolate grid operating data for locations in which measurements are not available. An assumption can be, for example, an assumed ratio or relationship between loads at industrial locations of the power grid compared to residential locations of the power grid.

In some examples, the grid model 114 can include measured data for certain time intervals, e.g., certain hours, and might not include measured data for other time intervals. The grid model 114 can use assumptions to estimate or interpolate grid operating data for time intervals in which measurements are not available. An assumption can be, for example, an assumed relationship between loads at a particular location at nighttime compared to daytime. In another example, an assumption can be an assumed relationship between loads at a particular location during an hour of the day in summertime, compared to during the same hour of the day in wintertime.

In some examples, the grid model 114 can include measured data for certain characteristics, e.g., electrical load, and might not include measured data for other characteristics. The grid model 114 can use assumptions to estimate grid operating data for characteristics for which measurements are not available. An assumption can be, for example, an assumed relationship between load and voltage at a particular location of the power grid.

In some examples, measured data can be used to resolve and reduce errors caused by assumptions in the grid model 114. In some examples, the grid model 114 can include conservative values in place of missing or incomplete data. In some examples, the grid model 114 can use worst case assumptions to enable worst case analysis.

The planned grid modifications 112 can include previously approved interconnection projects. Previously approved interconnection projects can be, for example, projects that are, or were, ahead in an approval queue. In this way, new interconnections can be evaluated against the as-built grid model 114 and also evaluated against the to-be-built grid model.

For example, a first user may submit interconnection data for a first interconnection. Based on satisfactory results, the first user may submit the first interconnection for approval, and the grid operator may approve the first interconnection. Grid model data for the first interconnection can then be stored as a planned grid modification 112 in the model database 116. A second user may then submit interconnection data for a second interconnection. The power grid simulation server 110 can then perform an electrical power grid simulation based on the as-built grid model 114 combined with the planned grid modifications 112, including the first interconnection. Thus, cumulative impacts of the first interconnection and the second interconnection can be modeled and considered before approving the second interconnection.

The process 600 includes generating, using the interconnection data for the proposed interconnection to the power grid, and the power grid model, and the simulated power grid data (606). The simulated power grid data can be based on simulating operation of the power grid, with the proposed interconnection coupled to a location of the power grid identified by the interconnection data, during a simulated time period. The simulated power grid data can include a number of different temporal and spatially dependent characteristics of the power grid.

The simulated time period can be, for example, a simulated year. In some examples, the power grid simulator 120 can generate simulated power grid data, or simulation results, for each hour of the simulated year. The simulation can include predicted loads and transients over the course of the simulated year based on historical data. For example, predicted loads may vary based on predicted seasonal effects (e.g., weather conditions) and calendar effects (e.g., weekends, holidays).

The location of the power grid can include a geographic location identified by the interconnection data. For example, the location can include a postal address or a latitude and longitude coordinate position. The simulated power grid data can be based on the proposed interconnection coupled, or electrically connected, to the power grid at the identified location.

The electrical grid characteristics can include, for example, voltage, current, power, power factor, load, utilization, and temperature. In some examples, the power grid simulator 120 can compare a pre-interconnection simulation to a post-interconnection simulation to determine an incremental impact of the interconnection.

For example, in stage (C) of FIG. 1, the power grid simulator 120 receives the interconnection data 108 from the user device 102, and the grid model 114 from the model database 116. The power grid simulator 120 can then perform a series of simulations. The simulations can be based on, for example, root-mean-square (RMS), power flow, positive sequence, and/or time series voltage transient analysis.

The amount of data processed during each simulation can depend on the size and framework of the distribution feeder that the proposed interconnection will connect to. The simulation can analyze predicted effects for all connections to the affected distribution feeder and all components of the affected distribution feeder. Thus, the complexity of simulations can vary depending on construction of the distribution feeder.

For example, the simulations can vary depending on length, power, and number of loads of a distribution feeder. A typical distribution feeder can range in length from approximately one mile to ten miles. A typical distribution feeder can range in power from approximately one to ten megawatts. The number of loads connected to a feeder can range from a few hundred residential loads to several thousand residential loads. In some cases, there may also be as few as a few dozen commercial or industrial loads, and as many as hundreds of commercial or industrial loads.

The construction of a distribution feeder can also vary based on location. In urban environments, residential loads typically share transformers. In rural environments, each residential load may have a separate transformer. Commercial and industrial loads are typically served by three-phase transformers. Thus, the number of loads and transformers in a feeder could be as low as a few hundred loads with a few hundred transformers for a rural feeder. The number of loads and transformers in a feeder could be as many as thousands of loads with hundreds of single phase transformers in an urban environment, coupled with dozens or hundreds of larger three phase loads and transformers.

In some examples, the power grid simulator 120 can simulate operation of multiple feeders. For example, simulations can include analyses of operation of all feeders across a geographic region, e.g., a city, county, province, or state. In some cases, the power grid simulator 120 can model operation of each individual feeder within the region, and can aggregate the results in order to model operation of the multiple feeders of the region.

In some cases, the power grid simulator 120 can model operational impacts of multiple feeders on each other. For example, multiple feeders may connect to a shared substation transformer. The power grid simulator 120 can simulate the impacts of transients of one feeder on another feeder that is connected to the same transformer.

The power grid simulator 120 can analyze the expected operation of the power grid with the interconnection installed by applying empirical historical data to the grid model with the interconnection installed. The empirical historical data can include historical electrical grid characteristics based on, for example, measurements, calculations, estimates, and interpolations. The characteristics can include, for example, load, voltage, current, and power factor. The empirical historical data can represent power grid operation of multiple interconnected components within a designated geographical area. The empirical historical data can represent average electrical grid operating characteristics over a period of time, e.g., multiple weeks, months, or years.

In some examples, the simulation can analyze the operation of the power grid prior to the addition of the proposed interconnection and after the addition of the proposed interconnection. For example, the power grid simulator 120 can generate, using the grid model 114, pre-interconnection simulated power grid data, or simulation results. The pre-interconnection simulation results can include electrical operating characteristics of the electrical power grid over a simulated period of time without the proposed interconnection.

The test evaluator 130 can evaluate, using the one or more metrics, the pre-interconnection simulation results to output pre-interconnection evaluation results. The pre-interconnection evaluation results can include pass and fail results for each metric for simulated operation without the proposed interconnection.

The simulation server 110 can compare the pre-interconnection evaluation results with the evaluation results for operation with the proposed interconnection. The simulation server 110 can then determine a change in evaluation results due to the proposed interconnection. Thus, the simulation server 110 can determine a direct incremental impact of the interconnection on the electrical grid operating conditions.

In some examples, the power grid simulator 120 can generate the pre-interconnection simulation results before the simulation server 110 receives the interconnection data 108. For example, the power grid simulator 120 can generate the pre-interconnection simulation results periodically, e.g., once per day or once per week. In some examples, the power grid simulator 120 can generate the pre-interconnection simulation results in response to an event, e.g., in response to the grid model 114 being updated. The test evaluator 130 can evaluate the pre-interconnection simulation results to generate pre-interconnection test results. The simulation server 110 can store the pre-interconnection simulation results, the pre-interconnection test results, or both, in the simulation database 126. Upon receiving interconnection data 108, the simulation server 110 can then compare the simulation results 122 for the proposed interconnection with the stored pre-interconnection simulation results. The simulation server 110 can also compare the test results 132 with the stored pre-interconnection test results.

In some examples, the simulations can cover a range of operating conditions, particularly under extremes of voltage from the Bulk Power System (BPS) and extremes in load on the electrical distribution feeder. The power grid simulator 120 can simulate corner cases of the system with the proposed interconnection added to the existing system. The simulations can also cover electrical grid conditions during steady-state operation and during transient operation. The power grid simulator 120 can accurately simulate operations of loads and sources, aggregated loads and sources, and disaggregated loads and sources.

In some examples, an interconnection such as an inverter connected resource may cause transients in the electrical power grid. For example, an interconnection may cause sudden changes in voltage magnitude and phase on the electrical power grid. Multiple interconnections can amplify the sudden changes, and may cause cascading trips. The power grid simulator 120 can examine both causes and effects of simulated electrical transients. For example, the power grid simulator 120 can analyze effects of the proposed interconnection on the electrical power grid, e.g., phase and voltage magnitude changes. The power grid simulator 120 can also analyze effects of the phase and voltage magnitude changes on the proposed interconnection.

In some examples, voltage from the BPS can change quickly relative to control capabilities of electrical loads and inverter connected resources of the distribution system. With greater numbers of interconnections, it is possible for rapid phase shift from the BPS to cause tripping in the distribution system, e.g., due to limitations of the phase-locked loops (PLLs) of the inverter connected resources. The power grid simulator 120 can model the PLLs of the inverter connected resources to predict conditions that may result in tripping.

Based on the series of simulations, the power grid simulator 120 outputs simulation results 122. The simulation results can include time-varying electrical power grid characteristics at different locations of the electrical power grid for the simulated time period. The power grid simulator 120 can output the simulation results 122 to the simulation database 126 and to a test evaluator 130. The simulation database 126 can store the simulation results 122 as simulation result data 124.

The process 600 includes evaluating, using one or more metrics, the simulated power grid data (608). The one or more metrics may reflect criteria from industry standards. For example, the one or more metrics may reflect criteria from interconnection standards such as IEEE 1547-2018. In some examples, the one or more metrics may reflect criteria from local industry standards. For example, simulation of interconnections in California may be evaluated based on criteria from California Rule 21, while simulation of interconnections in Hawaii may be evaluated based on criteria from Hawaii Rule 14H.

For example, in stage (D) of FIG. 1, the test evaluator 130 receives the simulation results 122. The test evaluator 130 can then perform tests and evaluations of the simulation results 122 to determine compliance with the metrics associated with the applicable standards.

As an example, the test evaluator 130 can evaluate the simulation results 122 using voltage constraint metrics. The test evaluator 130 can identify voltage constraint violations in accordance with a standard such as ANSI C84.1. The test evaluator 130 can identify particular grid locations and simulated times of the voltage constraint violations over the simulated time period. The test evaluator 130 can also determine a predicted number of violations that occur in the electrical power grid during each time increment of the simulated time period. For example, the test evaluator 130 can determine a number of voltage constraint violations that occur during each hour of the simulated year.

In addition to voltage constraints, other example metrics can include metrics associated with voltage variability, voltage fluctuations, periodic voltage deviations, voltage transients, thermal limit violations, and backfeed constraints. The metrics can also include protection coordination for hierarchical fuse/breaker operation in fault conditions, fault current response issues, transient overvoltage, overvoltage, undervoltage, fault current capability, fault current contribution, sensitivity to phase shift, and short circuit currents. The test evaluator 130 can evaluate the simulation results 122, using the metrics, in steady-state, transient, and dynamic conditions.

The process 600 includes outputting evaluation results of the one or more metrics (610). The evaluation results, e.g., test results 132, can include pass or fail results for each of the one or more metrics. The test results 132 can also include a time-varying number of violations of each metric over the simulated time period.

For example, in stage (E) of FIG. 1, the test evaluator 130 outputs the test results 132 to the simulation database 126 and to the user device 102. The simulation database 126 can store the test results as test result data 134. The user device 102 can provide the test results 132 to the user 104, e.g., through an output user interface 136.

The test results 132 can include an identification of failed metrics, the timing, frequency and duration of the failed metrics, and the grid locations of the failures. For passed metrics, the test results can also include margins to the passing metric.

In some examples, the test results 132 can include recommended changes to the proposed interconnection that can result in a passing score, reduce the number of violations, or both. For example, the simulation server 110 can modify the interconnection data 108. The power grid simulator can generate modified simulated power grid data, or modified simulation results, using the modified interconnection data. The test evaluator 130 can evaluate, using the one or more metrics, the modified simulation results to output modified test results. In this way, the simulation server 110 can validate the modified interconnection data against the same criteria used to evaluate the interconnection data 108.

The simulation server 110 can compare the modified test results to the test results 132. The simulation server 110 may determine that the modified test results are improved over the test results 132. For example, the modified test results may be improved due to including fewer failures and violations, including no failures, increasing a passing margin to one or more metrics, etc. In response to determining that the modified test results are improved over the test results 132, the simulation server 110 can output the modified interconnection data for the proposed interconnection. For example, the simulation server 110 can output the modified interconnection data for display to the user 104 as a recommendation.

Recommended changes to the interconnection application can include a range of changes including curtailment, rebuild of electrical assets, addition of storage, voltage controls, etc. Upon display of the recommendations to the user 104, the user 104 may then choose to incorporate the recommended modifications and resubmit the modified interconnection data. In some cases, in addition to or instead of recommended changes to the interconnection application, the test results 132 can include recommended changes to the power grid that would result in a passing score, reduce the number of violations, or both.

In stage (F) of FIG. 1, the user device 102 displays the test results 132 to the user 104 through the output user interface 136. The output user interface 136 can display a list of tests and results for each test. In some examples, the output user interface 136 can display a visualization of the simulation results 122, the test results 132, or both, in a two-dimensional and/or three-dimensional map view. In some examples, the output user interface 136 can display a graph, e.g., a line graph or a bar graph, that shows the number of violations over a period of time. The output user interface 136 can be interactive in order to enable the user 104 to examine the results. For example, the user 104 can select, e.g., using a computer mouse, an individual test, time period, or location, in order to view respective detailed simulation results. Example elements that can be displayed through the output user interface 136 are described with reference to FIGS. 3, 4A-4B, and 5.

FIG. 2 illustrates an example user interface 200 including input fields for various data. The user interface 200 shows data for a proposed solar panel interconnection. The user interface 200 can be displayed to a user through a user device, e.g., the user device 102 of the system 100.

The user interface 200 includes an input field for project location data 202. The project location data can include, for example, a street address of the proposed interconnection, or a latitude and longitude of the proposed interconnection. In some examples, the project location data can include an allowed variability for the proposed location of the interconnection.

The user interface 200 also includes input fields for solar photovoltaic plant panel details 204 and inverter details 206. The panel details 204 can include a power rating and an AC output for the solar panels. The inverter details 206 can include an inverter model, power rating, voltage rating, and power supply phase for the inverter.

The user interface 200 can include input fields indicating whether the inverter is certified 208 and whether the inverter is co-located with the load 210. The user interface 200 can also include a user-selectable icon 212 for submitting the interconnection data. Once the user selects the user-selectable icon 212, the user device 102 can send the interconnection data collected through the user interface 200 to the power grid simulation server 110.

Figure 3:
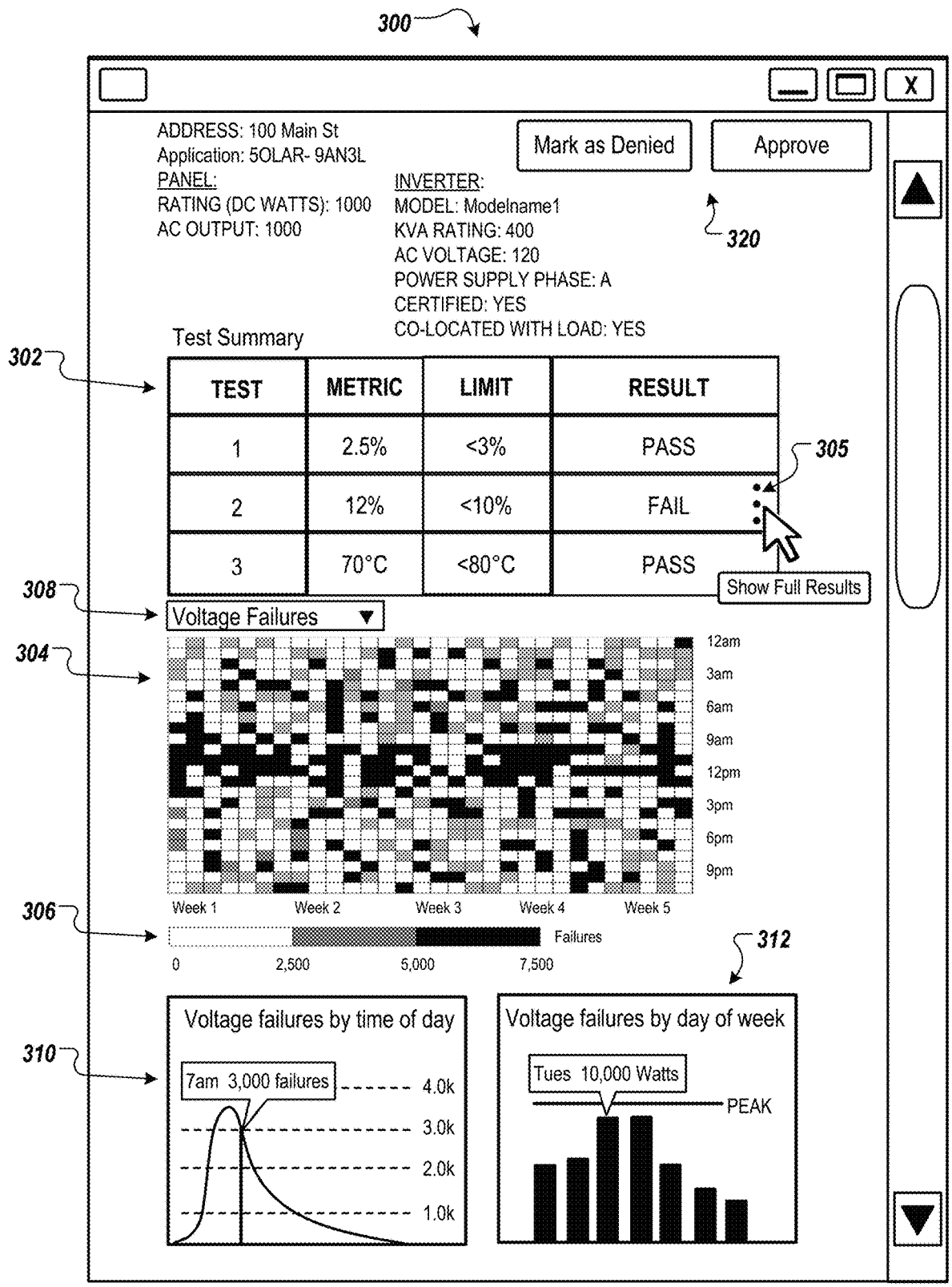
FIG. 3 illustrates an example user interface for display of interconnection simulation results.

FIG. 3 illustrates an example user interface 300 showing output results for an interconnection simulation. The user interface 300 shows data for a proposed solar photovoltaic plant interconnection, e.g., the proposed interconnection that was submitted through the user interface 200. The user interface 300 can be displayed to a user through a user device, e.g., the user device 102 of the system 100.

The user interface 300 can display a test summary 302 including a list of tests and results for each test. The test summary 302 can display the metric as determined by the simulation, and the limit to which the metric was evaluated against. The results can include a "pass" or "fail" verdict. In some examples, the test summary can include a user-selectable icon 305 that can enable the user to view the results in additional detail. For example, additional detail can include a map view showing a location of violations, a time view showing a time of violations, or both.

The user interface 300 includes an example graph 304 showing a number of voltage violations, or failures, over a simulated period of time. The graph 304 includes an x-axis representing progression of time measured by a first time increment, e.g., days, over a first time period, e.g., five weeks. The graph 304 includes a y-axis representing a progression of time measured by a second time increment, e.g., hours, over a second time period, e.g., a day. The graph 304 shows a number of points. Each point corresponds to an x-axis coordinate and a y-axis coordinate. Each point represents a time interval occurring during the time period of five weeks. A color shading of each point represents the number of violations of an electrical grid parameter during the time interval.

The number of violations during a particular hour during the five-week period can be represented by a color shading defined by a legend 306. Although the graph 304 shows voltage failures, the graph 304 can show violations for any parameter or metric tested by the test evaluator 130. In some examples, the user interface 300 can include an option for the user to switch between viewing different metrics. For example, the user interface 300 can include a drop-down selectable icon 308 to enable selection of other metrics, e.g., power failures.

In some examples, in response to a user selecting a point of the graph 304, the user interface 300 can display a corresponding evaluation result. The corresponding evaluation result can include, for example, a number of violations that occurred during the selected time increment.

For simplicity, only three ranges of failures are shown in the graph 304 of FIG. 3. According to the legend 306 Grid coordinates shaded white represent times during which the number of failures was between 0 and 2,500. Grid coordinates shaded gray represent times during which the number of failures was between 2,500 and 5,000. Grid coordinates shaded black represent times during which the number of failures was between 5,000 and 7,500. Additional ranges can be included, and can be represented by any color-coding scheme. In some examples, the color shading may be a gradient shading.

The user interface 300 includes example graphs 310, 312 showing time-varying trends of voltage failures. The graph 310 shows a number of voltage failures by time of day. The graph 312 shows a number of voltage failures by day of week. The graphs 310, 312 can show data for a particular day, or averaged data over multiple days. Data for the graphs 310, 312 can be, for example, simulation result data generated over a simulated time period.

In some examples, the user interface 300 can include user-selectable icons 320 for approving or denying the proposed interconnection. For example, the user may be a grid operator. Based on reviewing the simulation results as displayed through the user interface 300, the grid operator can select to approve or deny the interconnection.

Though described as including certain elements and features, the user interface 300 can include more elements or fewer elements. For example, a user may adjust settings and preferences for the elements displayed on the user interface. In some examples, a user may select a preference to view a two-dimensional map view of the grid instead of, or in addition to, the graph 304. In some examples, the user may select to view power failures instead of, or in addition to, voltage violations.

Figure 4A:
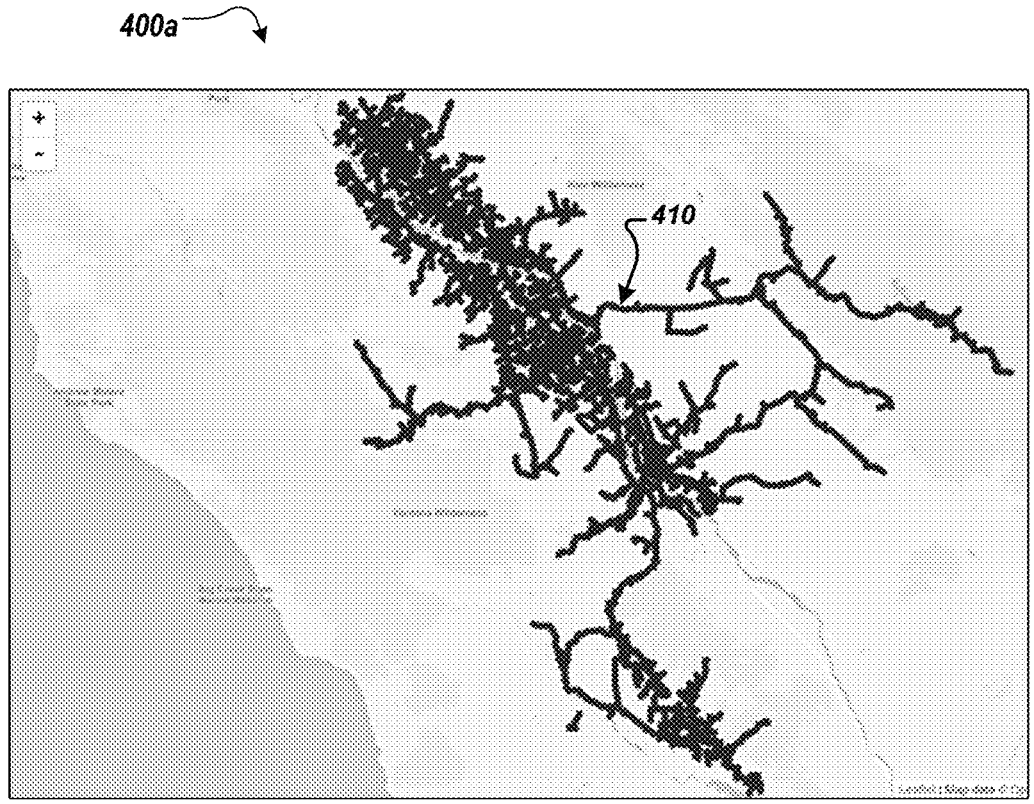
FIGS. 4A and 4B illustrate example user interface elements showing a two-dimensional map view of evaluation results.
Figure 4B:
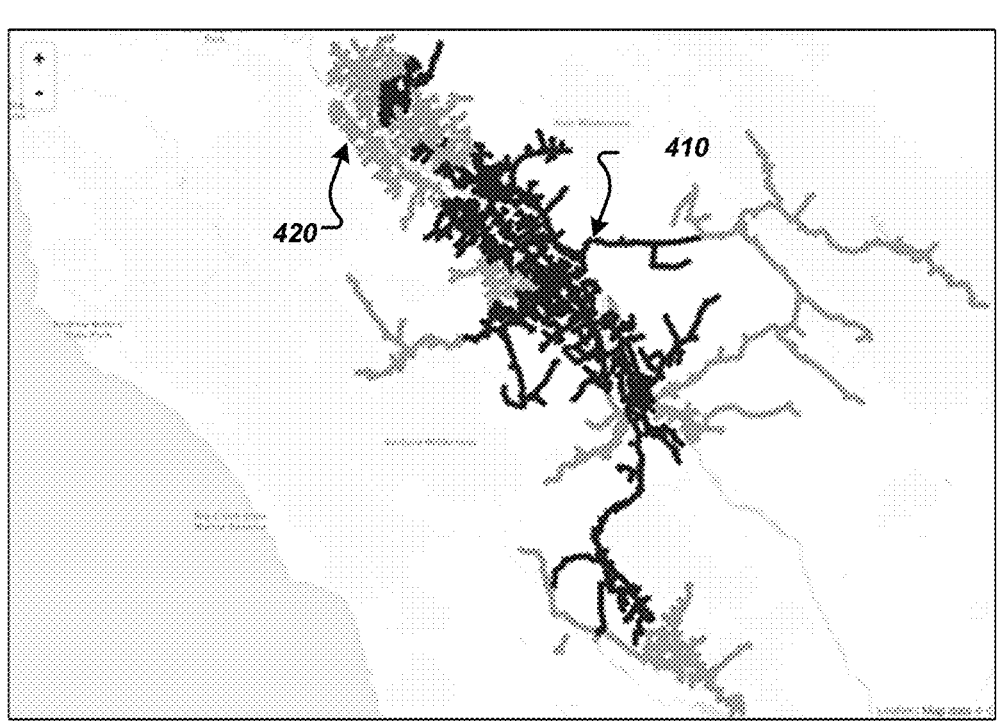
Figure 5:
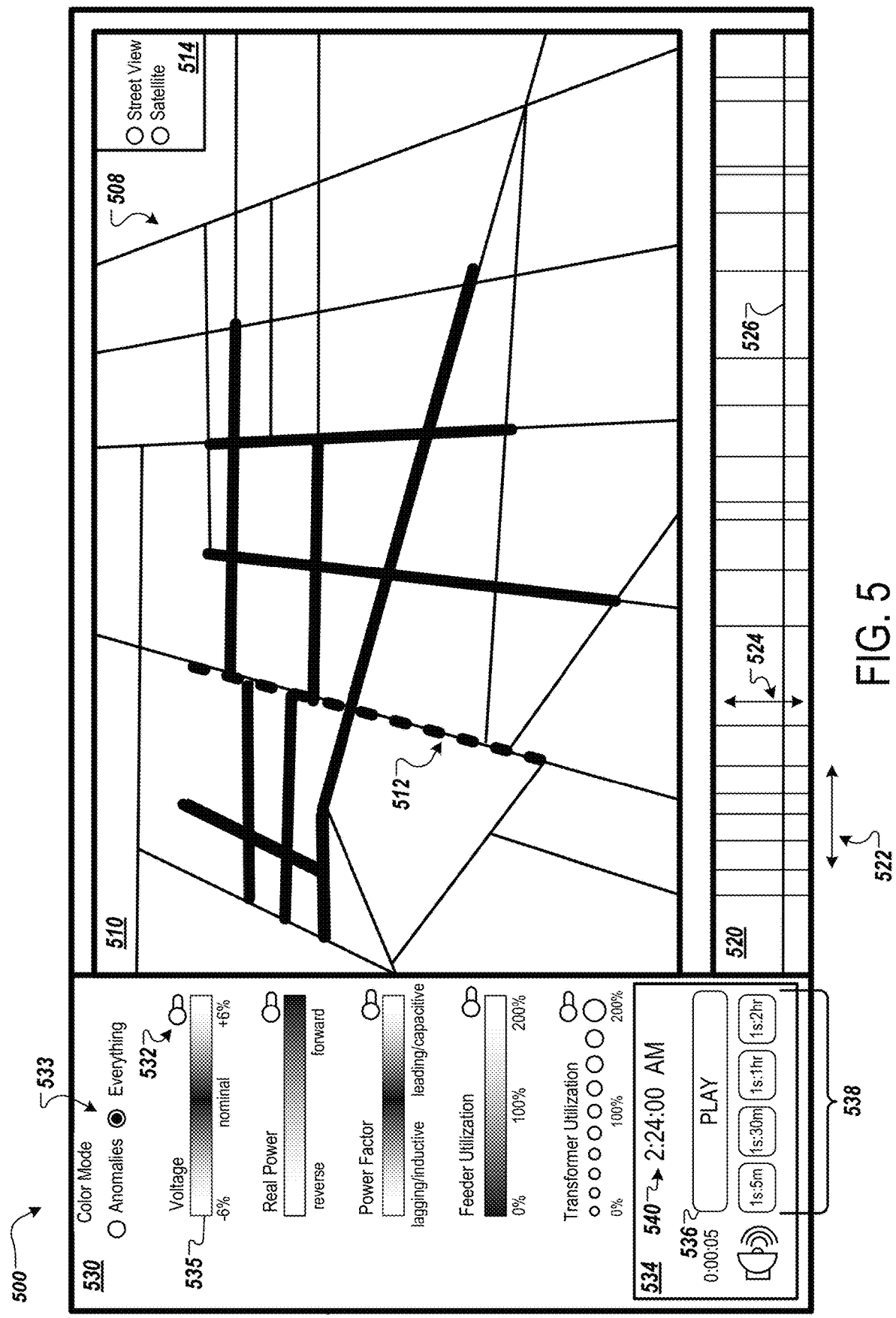
FIG. 5 illustrates an example of a user interface element showing a three-dimensional map view of power grid data.

FIGS. 4A, 4B, and 5 illustrate example user interface elements 400*a*, 400*b*, and 500, for displaying interconnection simulation results and test results. In some examples, the user interface elements 400*a*, 400*b*, and 500 can be incorporated into the user interface 300. In some examples, the user interface elements 400*a*, 400*b*, and 500 can be linked from the user interface 300. For example, using the user device 102, the user may select a link displayed on the user interface 300. Upon selecting the link, the user device 102 can present the user interface elements 400*a*, 400*b*, and/or 500 to the user.

FIGS. 4A and 4B illustrate example user interface elements 400*a*, 400*b* showing a two-dimensional map view of evaluation results. The user interface elements 400*a*, 400*b* can display a visualization of the simulations results 122, the test results 132, or both, in the two-dimensional map view.

The user interface elements 400*a*, 400*b* each show a line-diagram representation of power lines in the power grid overlaid on a map of a geographic region in which the power grid is located. The line-diagram includes a number of line segments. A color shading of each line segment can be used to represent the evaluation results at a particular spatial location of the power grid. The evaluation results can be for a particular simulated time, or can be averaged or accumulated over a period of simulated time.

Attributes of the line segments of the user interface elements 400*a*, 400*b* can represent characteristics of the simulated electrical power grid operation. An attribute can be, for example, a color, shading, or thickness of the line segment. Characteristics of the simulated operation can include e.g., voltage, real power, power factor, line utilization, and transformer utilization. Characteristics of the simulated operation can also include violations of electrical power grid metrics. For example, the attributes of the line segments can represent a location of voltage violations.

In FIGS. 4A and 4B, line segments represent locations of electrical power grid components. Dark shaded line segments 410 represent locations of the electrical power grid where there are no violations, or where the number of violations is below a threshold limit. Light shaded line segments 420 represent locations of the electrical power grid where there are violations, or where the number of violations is above a threshold limit.

In some examples, in response to a user selecting a point of the line segments, the user interface element 400*a* or 400*b* can display a corresponding evaluation result. The corresponding evaluation result can include, for example, a number of violations that occurred in the corresponding grid location over the simulated period of time.

In the user interface element 400*a*, the number of violations is below the threshold limit for all locations of the electrical power grid. Thus, all line segments of the user interface element 400*b* have a dark shading. The user interface element 400*a* may show, for example, power grid simulation results without a proposed interconnection.

In the user interface element 400*a*, the number of violations is below the threshold limit for some locations of the electrical power grid, and above the threshold limit for other locations of the electrical power grid. Thus, certain line segments of the user interface element 400*b* have a dark shading, while other line segments of the user interface element 400*b* have a light shading. The user interface element 400*b* may show, for example, power grid simulation results with a proposed interconnection. Thus, by comparing the user interface element 400*a* to the user interface element 400*b*, a user can compare simulated pre-interconnection and post-interconnection operation of the power grid. In the example of FIGS. 4A and 4B, installing the interconnection likely results in voltage violations in various locations of the electrical power grid.

FIG. 5 illustrates an example of a user interface element showing a three-dimensional map view of power grid data. The user interface element 500 includes a visualization of the power grid data in three windows. The user interface element 500 can show, for example, simulated electrical power grid characteristics for the electrical power grid with the proposed interconnection coupled to a location of the power grid identified by the interconnection data.

In some examples, the user interface element 500 can include a comparison view. The comparison view can enable a user to view simulated electrical power grid characteristics both for the as-built electrical power grid and for the electrical power grid with the proposed interconnection. By comparing the pre-interconnection characteristics with the post-interconnection characteristics, the user can determine impacts of the interconnection on the electrical power grid.

The user interface element 500 includes a first window 510. The first window 510 includes a line-diagram representation of power lines of the power grid. The user interface element 500 can also show representations of other elements of the power grid with the line-diagram. The line-diagram is overlaid on a map 508 of a geographic region. The map 508 of the geographic region is a map of the geographic region in which the power grid is located. The user interface element 500 can include a map menu 514. A user can select one or more icons of the map menu 514 in order to view the line-diagram overlaid on a street-view, satellite, aerial, and/or topological map view, or any combination of map views.

The line-diagram includes one or more line segments 512 (illustrated as dashes in one branch of the line diagram). Each line segment can represent a portion of the wires of the power grid. Attributes of each line segment 512 can represent power grid data at a particular spatial location of the power grid. In some implementations, the spatial resolution (and size in pixels) of each line segment can vary to accommodate the spatial resolution of the received power grid data. For example, if power grid data is available at 1000 foot intervals along a 10,000 foot length of feeder line, the GUI can represent that particular length of feeder line with 10 different line segments. The color and/or shade and/or width, and/or height of a line segment can indicate one or more characteristics of the power grid at that line segment at a particular point in time. Line segments can show moving arrows indicating the direction and magnitude of a characteristic of the power grid at that line segment at a particular point in time.

The user interface element 500 includes a player 534. The player 534 enables the user interface element 500 to show characteristics of the power grid over time. The player 534 includes a "play" icon 536 that allows the user to play, pause, and resume the display of characteristics of the power grid over time. The player also includes 538 icons that allow the user to select different playback rates. The player also includes a time display 540 of the time for which the characteristics of the power grid are shown.

The user interface element 500 includes a second window 520. The second window 520 includes at least one graph with an X axis in the direction of arrow 522 and a Y axis in the direction of arrow 524. Each graph can represent values of a characteristic of the power grid over time and space. Each value can be represented by respective coordinates on the graph and a shade. For each value of the characteristic, an X-coordinate represents a distance of the value from a reference point in the power grid, e.g., a power source. For each value of the characteristic, a Y-coordinate represents a time of the value. A marker perpendicular to the Y axis and moving in the direction of the Y axis marks the time of the values along the marker, which may also be the time displayed in the player 534 and the time of the characteristics of the power grid represented in the user interface element 500. A shade of the value represents a magnitude of the value. In some examples, the magnitude is an absolute magnitude. In some examples, the magnitude is a relative magnitude. In some examples, data may not be available for all locations of the power grid. Missing data can be represented by a dark or black shading.

The user interface element 500 includes a third window 530. The third window 530 includes a menu. The menu includes user-selectable icons 532 that permit toggling representation of different characteristics of the power grid on and off. The user can select the icons 532 of the menu in the third window 530 in order to view one characteristic or a selected combination of characteristics in the first window 510 and the second window 520. When a user selects one of the icons 532 to toggle a respective characteristic on, representation of the respective characteristic is displayed within the first window 510, the second window 520, or both. When a user selects more than one of the icons 532 to toggle a combination of respective characteristics on, a representation of the respective characteristics is displayed together spatially and temporally within the first window 510, and side-by-side in the second window 520, or both.

For the user-selectable icons 532 that permit toggling representation of different characteristics of the power grid, the characteristics themselves are represented by different colors, shown in the third window 530. The magnitude of the value of the characteristics can be represented by shades or gradients. Anomalous values of the characteristics can be represented by different colors or shades.

The third window 530 includes a selector 533 that allows the user to select, for the toggled on characteristics of the power grid, to display by color in the first window 510 and the second window 520 either all values or only anomalous values.

In some examples, a user can simulate adding and removing assets to the power grid. For example, the user can simulate adding power sources and/or power loads to the power grid. The user interface element 500 can display effects of the changing assets on the characteristics of the power grid.

In some examples, a user can input an optimization requirement for adjusting one or more characteristics. The computing system can compute a solution to the optimization requirement and can display simulated characteristics for implementing the solution.

This disclosure generally describes computer-implemented methods, software, and systems for electrical power grid visualization. A computing system can receive various electrical power grid data from multiple sources. Power grid data can include different temporal and spatially dependent characteristics of a power grid. The characteristics can include, for example, power flow, voltage, power factor, feeder utilization, and transformer utilization. These characteristics can be coupled; for example, some characteristics may influence others and/or their temporal and spatial dependence may be related.

Data sources can include satellites, aerial image databases, publicly available government power grid databases, and utility provider databases. The sources can also include sensors installed within the electrical grid by the grid operator or by others, e.g., power meters, current meters, voltage meters, or other devices with sensing capabilities that are connected to the power grid. Data sources can include databases and sensors for both high voltage transmission and medium voltage distribution and low voltage utilization systems.

The data can include, but is not limited to, map data, transformer locations and capacities, feeder locations and capacities, load locations, or a combination thereof. The data can also include measured data from various points of the electrical grid, e.g., voltage, power, current, power factor, phase, and phase balance between lines. In some examples, the data can include historical measured power grid data. In some examples, the data can include real-time measured power grid data. In some examples, the data can include simulated data. In some examples, the data can include a combination of measured and simulated data.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI)

that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any system or on the scope of what may be claimed, but rather as descriptions of features that may be specific to particular implementations of particular systems. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
    receiving interconnection data for a proposed interconnection to a power grid, wherein the proposed interconnection comprises an electrical power source or planned electrical power source that has not previously connected to the power grid;
    accessing a power grid model comprising a topological representation of the power grid, electrical specifications of grid components, and empirical operation characteristics;
    generating, using the interconnection data for the proposed interconnection to the power grid and the power grid model, simulated power grid data, wherein:
        the simulated power grid data is based on simulating operation of the power grid with the proposed interconnection coupled to a location of the power grid identified by the interconnection data during a simulated time period, and
        the simulated power grid data comprises a plurality of different temporal and spatially dependent characteristics of the power grid;
    evaluating the simulated power grid data, including comparing the simulated power grid data to one or more metrics derived from industry standards for power grid operations; and
    outputting evaluation results indicating, for each metric of the one or more metrics, whether simulated operation of the power grid with the proposed interconnection coupled to the location of the power grid identified by the interconnection data satisfies the metric.

2. The method of claim 1, wherein the evaluation results comprise pass or fail results for each of the one or more metrics.

3. The method of claim 1, wherein the simulated time period comprises a simulated year.

4. The method of claim 3, wherein generating simulated power grid data comprises generating simulated power grid data for each hour of the simulated year.

5. The method of claim 1, wherein the power grid model comprises:
    a model of real-world power grid assets; and
    a model of one or more previously proposed interconnections to the power grid that has not previously connected to the power grid.

6. The method of claim 1, wherein the interconnection data for the proposed interconnection to the power grid comprises one or more of a location, a size, a positioning, a power output, or a connecting phase of the proposed interconnection.

7. The method of claim 1, wherein the plurality of different temporal and spatially dependent characteristics comprise one or more of voltage, current, power, power factor, utilization, or temperature.

8. The method of claim 1, further comprising:
    generating, using the power grid model, pre-interconnection simulated power grid data representing power grid operations without the proposed interconnection coupled to the power grid;
    evaluating, using the one or more metrics, the pre-interconnection simulated power grid data to output pre-interconnection evaluation results indicating, for each metric of the one or more metrics, whether simulated operation of the power grid without the proposed interconnection coupled to the power grid satisfies the metric; and comparing the evaluation results for the simulated operation of the power grid with the proposed interconnection to the pre-interconnection evaluation results to determine a change in evaluation results caused by the proposed interconnection.

9. The method of claim 1, further comprising:

modifying the interconnection data for the proposed interconnection by changing at least one of a location, size, positioning, power output, or connecting phase of the proposed interconnection;

generating, using the modified interconnection data for the proposed interconnection, modified simulated power grid data;

evaluating, the modified simulated power grid data to output modified evaluation results indicating, for each metric of the one or more metrics, whether simulated operation of the power grid with the modified proposed interconnection satisfies the metric;

determining that the modified evaluation results are improved over the evaluation results; and in response, outputting the modified interconnection data for the proposed interconnection.

10. The method of claim 2, wherein outputting evaluation results comprises outputting, for each failed metric, a margin between a value of the simulated power grid data and a passing value for the metric.

11. The method of claim 1, wherein outputting evaluation results of the one or more metrics comprises generating a graphical user interface (GUI) comprising a graph representing the evaluation results, wherein the graph comprises:

an x-axis representing progression of time measured by a first time increment over a first time period;

a y-axis representing progression of time measured by a second time increment over a second time period, wherein the second time period is equal to the first time increment; and a plurality of points, wherein:

each of the plurality of points corresponds to an x-axis coordinate and a y-axis coordinate and represents a time interval occurring during the first time period; and a color shading of each of the plurality of points represents a number of violations of an electrical grid parameter during the time interval, wherein in response to a user selecting a point of the graph, the GUI displays a corresponding evaluation result.

12. The method of claim 1, wherein outputting evaluation results of the one or more metrics comprises generating a GUI comprising a map view of the evaluation results, wherein the map view comprises:

a line-diagram representation of power lines of the power grid overlaid on a map of a geographic region in which the power grid is located, the line-diagram comprising a plurality of line segments, wherein a color shading of each line segment represents the evaluation results at a particular spatial location of the power grid, wherein in response to a user selecting a line segment in the map view, the GUI displays a corresponding evaluation result.

13. The method of claim 1, wherein the one or more metrics include voltage constraint metrics derived from industry standards for power grid operations.

14. The method of claim 13, wherein the voltage constraint metrics define criteria for at least one of:
steady-state voltage;
transient voltage;
voltage variability; and
overvoltage.

15. The method of claim 1, wherein the evaluation results include particular grid locations and times of simulated violations of the one or more metrics over the simulated time period.

16. The method of claim 1, wherein the evaluation results include a number of violations of the one or more metrics that are simulated to occur over the simulated time period.

17. A system comprising one or more computers and one or more storage devices on which are stored instructions that are operable, when executed by the one or more computers, to cause the one or more computers to perform operations comprising:

receiving interconnection data for a proposed interconnection to a power grid, wherein the proposed interconnection comprises an electrical power source or planned electrical power source that has not previously connected to the power grid;

accessing a power grid model comprising a topological representation of the power grid, electrical specifications of grid components, and empirical operation characteristics;

generating, using the interconnection data for the proposed interconnection to the power grid and the power grid model, simulated power grid data, wherein:

the simulated power grid data is based on simulating operation of the power grid with the proposed interconnection coupled to a location of the power grid identified by the interconnection data during a simulated time period, and the simulated power grid data comprises a plurality of different temporal and spatially dependent characteristics of the power grid;

evaluating the simulated power grid data, including comparing the simulated power grid data to one or more metrics derived from industry standards for power grid operations; and outputting evaluation results indicating, for each metric of the one or more metrics, whether simulated operation of the power grid with the proposed interconnection coupled to the location of the power grid identified by the interconnection data satisfies the metric.

18. The system of claim 17, wherein the evaluation results comprise pass or fail results for each of the one or more metrics.

19. The system of claim 17, wherein the simulated time period comprises a simulated year, and wherein generating simulated power grid data comprises generating simulated power grid data for each hour of the simulated year.

20. A non-transitory computer storage medium encoded with instructions that, when executed by one or more computers, cause the one or more computers to perform operations comprising:

receiving interconnection data for a proposed interconnection to a power grid, wherein the proposed interconnection comprises an electrical power source or planned electrical power source that has not previously connected to the power grid;

accessing a power grid model comprising a topological representation of the power grid, electrical specifications of grid components, and empirical operation characteristics;

generating, using the interconnection data for the proposed interconnection to the power grid and the power grid model, simulated power grid data, wherein:
- the simulated power grid data is based on simulating operation of the power grid with the proposed interconnection coupled to a location of the power grid identified by the interconnection data during a simulated time period, and
- the simulated power grid data comprises a plurality of different temporal and spatially dependent characteristics of the power grid;

evaluating the simulated power grid data, including comparing the simulated power grid data to one or more metrics derived from industry standards for power grid operations; and outputting evaluation results indicating, for each metric of the one or more metrics, whether simulated operation of the power grid with the proposed interconnection coupled to the location of the power grid identified by the interconnection data satisfies the metric.

\* \* \* \* \*